United States Patent [19]
Crowley

[11] 3,871,476
[45] Mar. 18, 1975

[54] SKIRT FOR AIR CUSHION VEHICLE

[76] Inventor: Walter A. Crowley, Rt. 1, Box 3352, Oak Harbor, Wash. 98277

[22] Filed: Oct. 2, 1972

[21] Appl. No.: 294,334

[52] U.S. Cl. .............................................. 180/127
[51] Int. Cl. .......................... B60v 1/02, B60v 1/16
[58] Field of Search .................... 180/127, 128, 129

[56] References Cited
UNITED STATES PATENTS

| 3,166,137 | 1/1965 | Cooper | 180/127 |
|---|---|---|---|
| 3,254,731 | 6/1966 | Schreiber | 180/127 |
| 3,265,144 | 8/1966 | Shaw | 180/127 |
| 3,327,797 | 6/1967 | Bertin | 180/127 |
| 3,353,617 | 11/1967 | Hopkins | 180/127 |
| 3,400,779 | 9/1968 | Grace | 180/127 |

FOREIGN PATENTS OR APPLICATIONS

| 1,110,798 | 4/1968 | Great Britain | 180/128 |

*Primary Examiner*—Robert R. Song
*Assistant Examiner*—John P. Silverstrim
*Attorney, Agent, or Firm*—Seed, Berry, Vernon & Baynham

[57] ABSTRACT

A segmented detachable skirt for use about the periphery of an air cushion-type vehicle. Each segment is removably inter-connected with both the adjoining segments and the main structure of the air cushion vehicle and includes a selectively rigidified finger-like element to increase the stiffness on each segment and yet allows flexibility for movement over irregular surfaces. Each segment has a detachable wear strip extending horizontally across the bottom such that the entire segment does not have to be replaced after ordinary wear but the worn portion may be easily replaced.

5 Claims, 3 Drawing Figures

PATENTED MAR 18 1975　　　　　　　　　3,871,476
FIG. 1
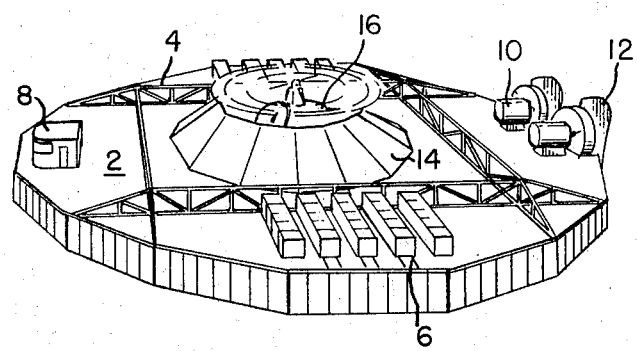
FIG. 2
FIG. 3
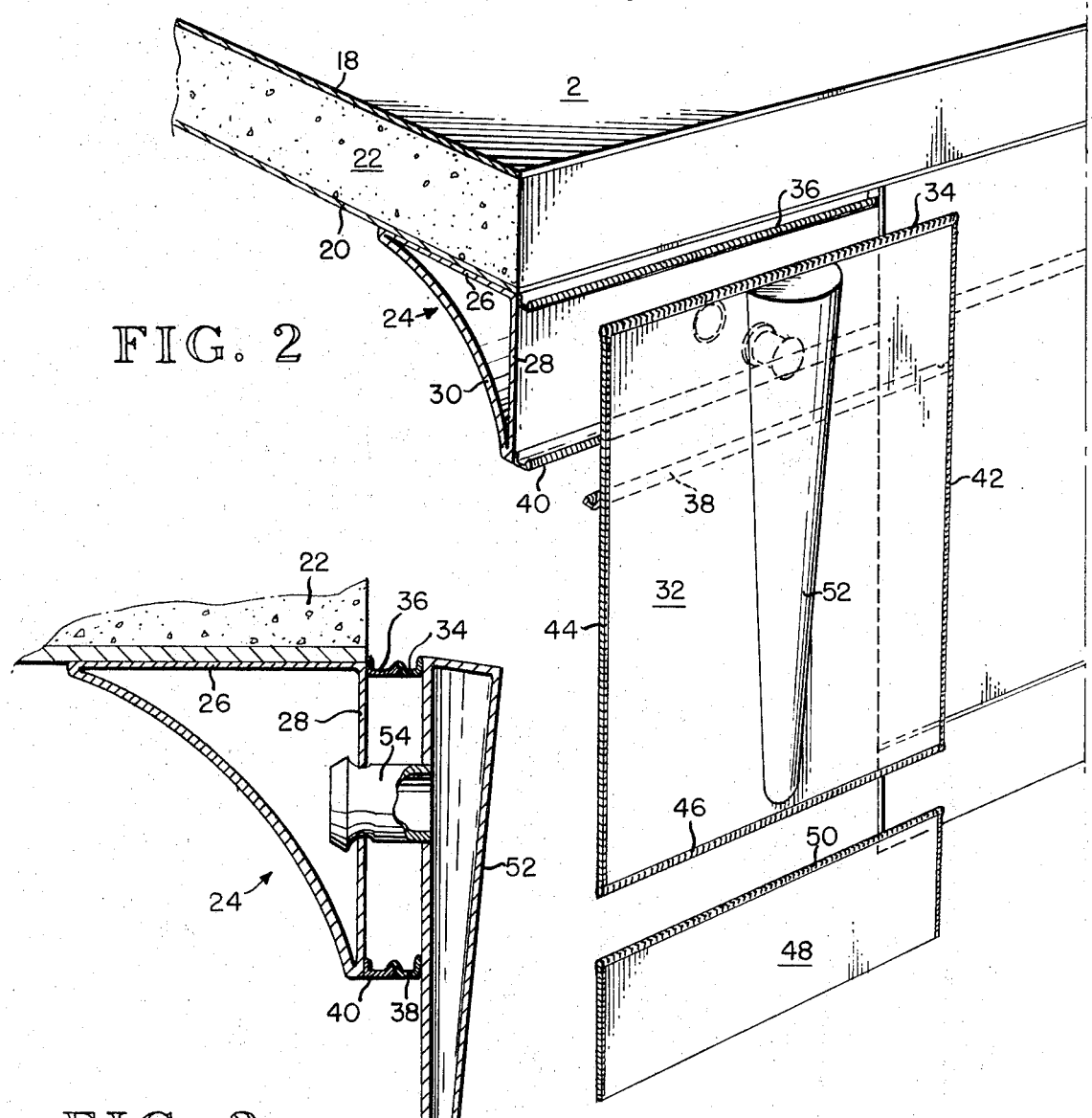

SKIRT FOR AIR CUSHION VEHICLE

BACKGROUND OF THE INVENTION

Air cushion vehicles have been long-known and their advantages of efficiency and the like are also well-known. In order for an air cushion vehicle to efficiently function it must include a downwardly depending skirt to form the sidewalls of a plenum such as is shown in U.S. Pat. No. 3,285,535 granted on Nov. 15, 1966 to the present inventor.

One of the problems with the skirts as used upon hereinbefore existing air cushion vehicles has been that they have been inherently rigid so that the vehicle could not pass over upwardly projecting objects without damage to the skirt and thus required a smooth supporting surface. Flexible skirts are also known in the art of air cushion vehicles but there are circumferential skirts which are a single fabricated unit. If damage is done to the flexible skirt as hereinbefore known, the entire skirt must be replaced or the damaged portion severed and a new portion secured in its place either of which is extremely expensive and a time-consuming repair.

One of the disadvantages in the use of a flexible skirt lies in the fact that if it is caught in a sufficiently strong cross current or if contacted by an upwardly extending object it will fold inwardly into the plenum chamber allowing excessive escape of the air pressure and thus eventually settling of the vehicle, a result which could on occasion be disastrous.

With the above known problems of the presently-existing skirts for air cushion vehicles it is an object of the present invention to provide a segmented skirt for use on an air cushion vehicle wherein damage to one segment does not necessitate replacement of the entire skirt but only replacement of the damaged segment.

Another object of the present invention is to provide a flexible segmented skirt wherein each segment includes a stiffening finger which may be selectively made relatively stiff to hold the segment in a relatively vertical position to form an efficient plenum. Alternatively the segments may be made more flexible such as when the air cushion vehicle is deactivated the skirt will collapse without interfering with the vehicle.

A further object of the present invention to provide a segment of a skirt for an air cushion vehicle wherein the bottom portion of each segment is a removable wear strip whereby the portion of the skirt which is most subjected to wear may be easily replaced.

A still further object of the present invention is to provide a segmented skirt for an air cushion vehicle wherein each of the segments are quickly and easily removable, each segment being attached to both the main body portion of the air cushion vehicle as well as to each other, such attachment being sufficiently strong to assure that the skirt has adequate hoop strength.

BRIEF DESCRIPTION OF THE DRAWINGS

FIG. 1 is an isometric view of an air cushion vehicle, depicting the environment wherein the present invention could well be used.

FIG. 2 is an enlarged, exploded view showing one segment of the inventive skirt and its attachment to the vehicle.

FIG. 3 is a partial sectional view through one of the stiffening fingers of the segment as shown in FIG. 2.

DETAILED DESCRIPTION OF THE DRAWINGS

As seen in FIG. 1, the inventive skirt is shown as utilized on a helicopter supported air cushion platform wherein the cargo carrying deck portion 2 is reinforced by structural girders 4 such that it may adequately support cargo 6. The forward portion of the deck 2 includes a control cabin 8, the after portion has mounted thereon pusher motors 10 and vertically disposed control rudders 12. Located centrally of the platform 2 is a segmented pod having a diffuser 14 for receiving a helicopter 16 which, as explained in hereinabove noted U.S. Pat. No. 3,285,535, provides the lifting power for the platform utilizing the propeller downwash.

As can be seen in FIG. 2, the deck 2 is of a sandwich-type structure having an upper plate 18, a lower plate 20 and a bouyant spacing means 22 which could be any of the known closed cell foam plastics or honeycomb structure. Secured about the entire outer periphery of the deck 2 is a conduit 24 having a hollow interior, a pair of right angle legs 26, 28 which conform to the bottom of the deck and form a depending flange at the outer edge of the deck to support the skirt as described hereinafter. The closing portion of the conduit 24 which completes the chanelling passageway is an inwardly curved portion 30 which serves, as noted above, not only to enclose the conduit but further serves as an air guiding and directing curved surface. Air forced outwardly under the bottom of deck contacts the surface 30 is then turned to a downward direction forming a vertical air wall below the edge of the skirt. This conduit further serves to stiffen the outer edge of the deck.

The skirt segment 32 comprises a generally rectangular main body portion having zippers or similar fastening means about its entire periphery. The upper zipper 34 is adapted to be mated with a zipper 36 around the entire periphery of the deck. A second horizontal zipper 38 is positioned along the segment 32 a distance below zipper 34 and parallel thereto. Zipper 38 is adapted to be interconnected with its complementary element 40 located at the bottommost portion of the conduit 24.

It is to be noted that when segments 34 and 36 of one zipper and 38, 40 of the other parallel zipper are both mated the intermediate portion of the segment of the skirt will be held rigidly between the two zippers. The side zippers 42, 44 are such that a plurality of segments 32 may be zipped together forming a skirt around the periphery of the deck and the completed skirt will have enough integral strength to withstand the hoop tension caused by the plenum pressure.

A zipper 46 is provided at the bottom of the segment 32 such that a wear strip 48 with a mating portion 50 of zipper 46 such that the wear strip can be zipped on and off as needed for replacement.

One or more stiffening fingers 52 are provided for each segment 32 and comprises an outwardly bowed closed attachment which may have a semi-conical shape. As noted above, the finger 52 is closed with the exception of an outwardly extending male member 54 which is mounted to the segment 32 and provides an opening into the finger 52. The male member is located upon each segment between zipper portions 34, 36 and 38, 40. When zipper portions 34, 36 and 38, 40 are meshed the male member 54 extends through an opening in the outer wall 28 of conduit 24 such that air under pressure within the conduit 24 is forced into the finger 52 stiffening the entire skirt.

As can be seen, the segmented skirt as hereinabove described allows the skirt to be very conveniently assembled, repaired or replaced. The panels in the preferred embodiment are secured together by strong resistant zippers and could be reinforced by simple fasteners at intervals. It is to be understood that the attachment or interconnection could be of any well-known source, the only requirement being that it is easily attached and removable for ease of replacement and repair. The selectively stiffened fingers in each segment allow a rigidification during transport of the vehicle and yet permit flexing when the vehicle passes over upwardly extending objects. When the vehicle is at rest, the fingers are allowed to completely collapse permitting the vehicle to settle upon the supporting surface.

The embodiments of the invention in which an exclusive property or privilege is claimed are defined as follows:

1. A skirt for use in an air-cushion vehicle having a main body portion comprising:
    a plurality of flexible, depending segments secured around the periphery of the main body of the vehicle and thus serving as the sides of the plenum,
    means for removably securing the segments together to form a continuous closed skirt,
    means for removably, individually securing each segment to the periphery of the main body portion, and
    means on each segment of the skirt and in fluid communication with the source of air under pressure to selectively rigidify each segment while still allowing sufficient flexibility to allow the vehicle to pass over upwardly projecting objects without damage.

2. A skirt as in claim 1 wherein the means on each segment to selectively rigidify each segment comprises a hollow, air-inflatable finger having a closed lower end extending substantially the full vertical dimension of each segment.

3. A skirt as in claim 1 wherein the means for removably securing the segments together comprises respective zippers extending substantially the full length of the contiguous edges of adjacent segments.

4. A skirt as in claim 1 including a conduit extending about the periphery of the main body portion wherein said conduit forms a smooth, downwardly curved hollow member which also serves to guide the air flow downwardly about the interior of the skirt.

5. A skirt as in claim 1 wherein the means for removably, individually securing the segments to the main body portion comprises a pair of vertically spaced, horizontally disposed zippers at the upper portion of each segment.

* * * * *